(12) United States Patent
Surazski et al.

(10) Patent No.: US 8,180,361 B2
(45) Date of Patent: May 15, 2012

(54) METHODS AND SYSTEMS FOR BASE STATION INSTALLATION IN DISTRIBUTED CALL PROCESSING NETWORKS

(75) Inventors: Mieczyslaw Surazski, Ottawa (CA); Kasper Reinink, Nepean (CA)

(73) Assignee: Alcatel Lucent, Paris (FR)

( * ) Notice: Subject to any disclaimer, the term of this patent is extended or adjusted under 35 U.S.C. 154(b) by 942 days.

(21) Appl. No.: 11/634,255

(22) Filed: Dec. 6, 2006

(65) Prior Publication Data

US 2008/0137595 A1    Jun. 12, 2008

(51) Int. Cl.
*H04W 72/00* (2009.01)
(52) U.S. Cl. ........ 455/453; 370/338; 370/349; 370/467; 370/469
(58) Field of Classification Search .................. 370/338, 370/349, 467, 469; 455/453
See application file for complete search history.

(56) References Cited

U.S. PATENT DOCUMENTS

| | | | |
|---|---|---|---|
| 2005/0091307 A1* | 4/2005 | Venkatsubra et al. | 709/203 |
| 2005/0213555 A1* | 9/2005 | Eyuboglu et al. | 370/349 |
| 2005/0221839 A1* | 10/2005 | Chan et al. | 455/453 |

FOREIGN PATENT DOCUMENTS

| | | | |
|---|---|---|---|
| WO | WO 2005053333 A1 * | 6/2005 | |
| WO | WO 2005086421 A1 * | 9/2005 | |

OTHER PUBLICATIONS

3GPP TS 25.432 V6.0.0 (Dec. 2003)—3rd Generation Partnership Project; Technical Specification Group Radio Access Network; UTRAN lub interface: signalling transport (Release 6).*
IETF RFC 2960 —Stream Control Transmission Protocol, Oct. 2000.*

* cited by examiner

*Primary Examiner* — Marivelisse Santiago Cordero
*Assistant Examiner* — Dung Hong
(74) *Attorney, Agent, or Firm* — Fay Sharpe LLP (57) ABSTRACT

Methods and systems are provided for establishing a logical flow path between a radio network controller (RNC) having multiple call processors that are operable in a distributed manner and a base station, in particular a Node B, being served by the RNC using an internet protocol (IP) transport technology. In some embodiments a method comprises configuring of IP addresses to be used by the RNC and base station, establishing paths based on communication ports in the RNC and base station, performing cell initialization and establishing common channel paths between the RNC and base station. Methods described herein include a step for Node B attachment that can be added to a Node B and RNC installation phase that is current part of 3GPP standards as part of a "plug and play" deployment method. The methods for Node B attachment to the network enable the Node B to be installed and dynamically registered with the RNC. The Node B obtains access to distributed call processing resources from the RNC over public and IP networks to offer services to UEs that the newly attached Node B serves.

16 Claims, 6 Drawing Sheets

METHODS AND SYSTEMS FOR BASE STATION INSTALLATION IN DISTRIBUTED CALL PROCESSING NETWORKS

FIELD OF THE INVENTION

The invention relates to base station installation for distributed call processing systems.

BACKGROUND OF THE INVENTION

UTRAN (Universal Mobile Telecommunications System (UMTS) Terrestrial Radio Access Network) is a collective term for base stations, often referred to as Node B's and radio network controllers (RNC) that are included in a UMTS radio access network. UMTS is a particular mobile radio access technology (RAT) common in Europe that uses wideband code division multiple access (W-CDMA) as an underlying standard. UTRAN can be used for circuit switched and packet switched traffic. In initial standards for supporting UMTS, the transport technology specified for an RNC/Node B interface was Asynchronous Transfer Mode (ATM).

RNCs provide control functionality for the Node B's. An RNC and a Node B can be co-located, but more often a single RNC is positioned to serve multiple Node B's. A Node B generally has minimum functionality, as it is controlled by a serving RNC.

A "logical" interface known as an "IuB" exists between the RNC and Node B. The UTRAN has three other logical interfaces for communicating with the rest of the UMTS radio access network. A first interface is an "Iu" interface for connecting the RNC to the core network. A second interface is a "Uu" interface for connecting the Node B to the mobile stations, for example cell phones or wireless modems in computers. A third interface is an "IuR" interface for connecting two RNCs.

Figure 1:
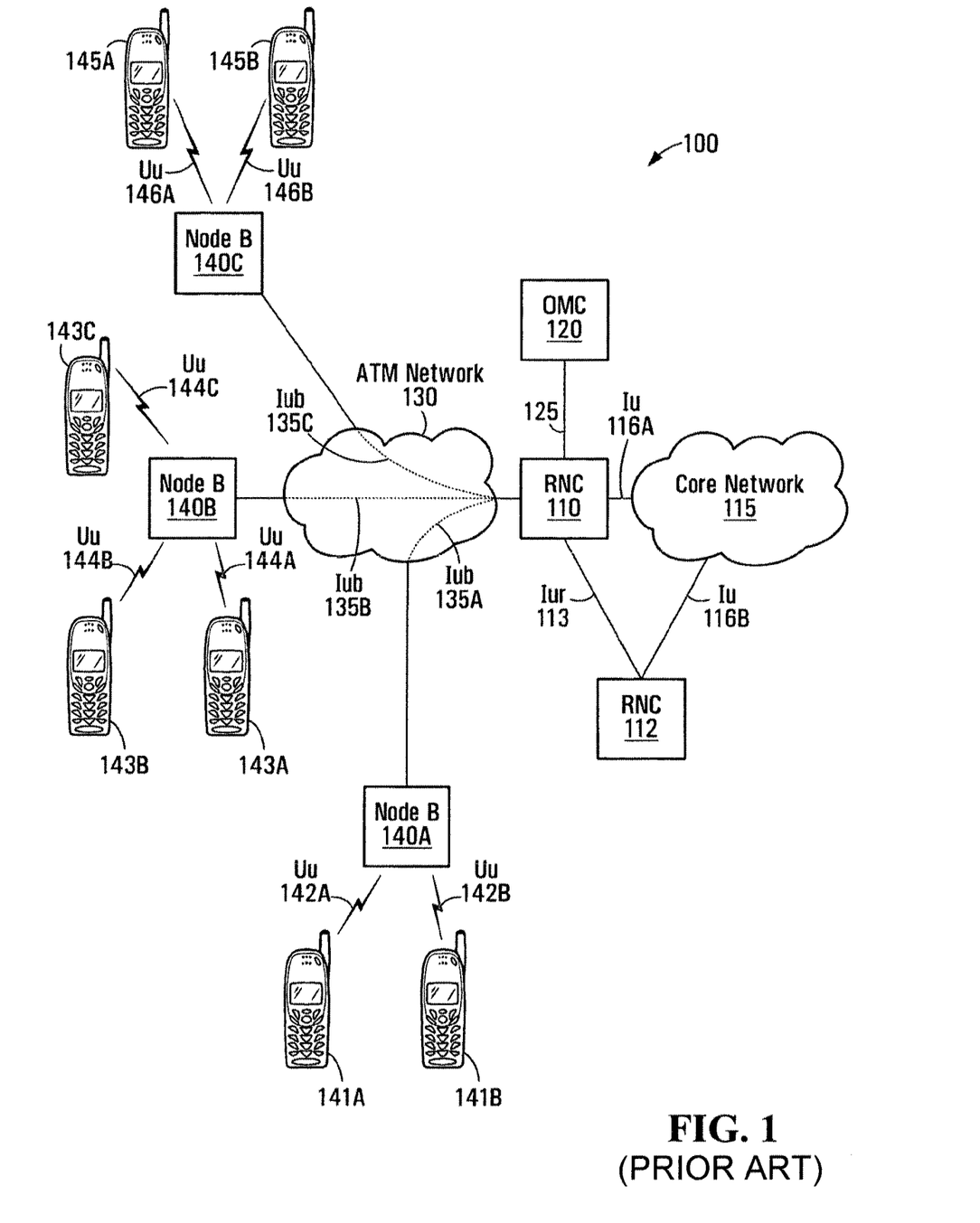
FIG. 1 is a block diagram of a portion of a UMTS (Universal Mobile Telecommunications System) network.

FIG. 1 illustrates a portion of an example of a UMTS radio access network 100 using ATM as a transport technology in the IuB interface. A core network 115 is coupled to multiple RNCs; two are shown in the illustrated example, RNC 110 and RNC 112. The core network 115 is coupled to RNC 110 via logical interface Iu 116A and coupled to RNC 112 via logical interface Iu 116B. The two RNCs 110,112 are shown coupled together via logical interface IuR 113. RNC 110 is coupled to an operations and maintenance center (OMC) 120 over link 125. The OMC oversees the operation of the network. Each of the network elements includes operation and application management (OAM) functionality that is capable of interacting with the OMC. RNC 110 is coupled to an ATM network 130. Multiple Node B's, in the illustrated example three are shown 140A, 140B, 140C, are also coupled to the ATM network 130. Each RNC to Node B path represents a logical interface IuB between the two elements. The RNC 110 to Node B 140A connection is logical interface IuB 135A. The RNC 110 to Node B 140B connection is logical interface IuB 135B. The RNC 110 to Node B 140C connection is logical interface IuB 135C. Each Node B is in wireless communication with one or more mobile stations, more generally referred to as user equipment (UE). For example, Node B 140A is in communication with UE 141A and UE 141B, Node B 140B is in communication with UE 143A, UE 143B and UE 143C and Node B 140C is in communication with UE 145A and UE 145B. The Node B's and the UEs they serve are coupled via logical interfaces Uu. Node B 140A is in communication with UE 141A via Uu 142A and UE 141B via Uu 142B, Node B 140B is in communication with UE 143A via Uu 144A, UE 143B via Uu 144B and UE 143C via Uu 144C and Node B 140C is in communication with UE 145A via Uu 146A and UE 145B via Uu 146B.

SUMMARY OF THE INVENTION

According to one aspect of the invention, there is provided a method for establishing a logical flow path between a radio network controller (RNC) having multiple call processors that are operable in a distributed manner and a base station being served by the RNC using an internet protocol (IP) transport technology, the method comprising establishing call control paths between the RNC and base station using request/response messaging initiated by the base station.

In some embodiments, establishing call control paths between the RNC and base station comprises: attach request/response messaging occurring between the Node B and the RNC, which is initiated by the Node B, for selection of transport address information in the RNC; and the Node B establishing SCTP associations between the Node B and the RNC based at least in part on the attach request/response messaging.

In some embodiments, establishing call control paths between the RNC and base station further comprises balancing a load on RNC processing resources.

In some embodiments, balancing a load on RNC processing resources comprises: the RNC selecting RNC ports and an RNC IP address dedicated to the base station for establishing at least one call control path, the selecting based on awareness of previously allocated processing resources.

In some embodiments, establishing call control paths between the RNC and base station further comprises: the base station sending an attach request message comprising an identification of the base station, a base station Node B control port (NCP) number, a base station communication control port (CCP) number; the base station receiving an attach response message comprising an RNC control plane IP address, an RNC NCP number and an RNC CCP number.

In some embodiments, the method further comprises the base station forming SCTP (stream control transmission protocol) associations using the base station NCP number, the base station CPP number, a base station control plane IP address, the RNC control plane IP address, the RNC NCP number and the RNC CCP number.

In some embodiments, the method further comprises:
configuring of IP addresses to be used by the RNC and base station; initializing the base station for operation with the RNC.

In some embodiments, configuring of IP addresses to be used by the RNC and base station comprises: notifying the base station of a first RNC control plane IP address as a primary destination IP address and a second RNC control plane IP address as a backup destination IP address for sending attach request messages.

In some embodiments, establishing call control paths between the RNC and base station further comprises: the RNC receiving an attach request message comprising an identification of the base station, a base station Node B control port (NCP) number and a base station communication control port (CCP) number; the RNC selecting an RNC control plane IP address, an RNC NCP number and an RNC CCP number; the RNC sending an attach response message comprising the selected RNC control plane IP address, the selected RNC NCP number and the selected RNC CCP number.

In some embodiments, selecting an RNC control plane IP address, an RNC NCP number and an RNC CCP number comprises: selecting the RNC control plane IP address, the RNC NCP number dedicated to the base station and the RNC CCP number in a manner to balance a load on RNC processing resources.

In some embodiments, the method further comprises establishing calls between user equipment (UE) and the RNC via the base station subsequent to initializing the base station for operation with the RNC.

In some embodiments, configuring of IP addresses to be used by the RNC comprises assigning static IP addresses to the RNC.

In some embodiments, selecting an RNC control plane IP address comprises dynamically assigning an IP address to the base station.

In some embodiments the method further comprises: repeating the method each time the base station restarts connection to an RNC due to any one of: a network outage and a relocation to another point of attachment.

According to another aspect of the invention, there is provided a system for performing methods described herein, the system comprising: one or more radio network controller (RNC) coupled to a core network, at least one RNC of the one or more RNC having multiple call processors that are operable in a distributed manner; each of the at least one RNC coupled to: at least one base station via an IP network wherein during establishment of a logical link between a respective RNC/base station pair, the respective RNC base station pair use request/response messaging initiated by the base station to define call control paths between the RNC/base station pair.

In some embodiments, during establishment of a logical link between a respective RNC/base station pair the RNC selects RNC ports and an RNC IP address dedicated to the base station for establishing a call control path for the logical link between the respective RNC and base station in a manner that enables balancing a load on the multiple call processors.

According to still another aspect of the invention, there is provided a base station comprising: a transmitter for transmitting an attach request message comprising an identification of the base station, a base station Node B control port (NCP) number, a base station communication control port (CCP) number; a receiver for receiving an attach response message comprising a radio network controller (RNC) control plane IP address and an RNC Node B control port (NCP) number and an RNC communication control port (CCP) number; a configuration processor for generating a logical interface between the base station and the RNC based at least in part on information received in the attach response message.

In some embodiments, the logical interface is an SCTP (stream control transmission protocol) association defined by IP addresses and port numbers of the base station and the RNC.

According to yet another aspect of the invention, there is provided a radio network controller (RNC) comprising: a receiver for receiving an attach request message comprising an identification of a base station, a base station Node B control port (NCP) number, a base station communication control port (CCP) number, and a transmission retry interval, a processor for selecting connection path port numbers and an RNC control plane IP address to enable a logical interface between the RNC and the base station; a transmitter for transmitting an attach response message comprising the RNC control plane IP address and the connection port numbers.

In some embodiments, the RNC further comprises a plurality of call processors operable in a distributed manner, wherein the selection processor performs the selecting based on balancing the load for the plurality of call processors.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF THE EMBODIMENTS OF THE INVENTION

Evolution of UTRAN networks has suggested using connectionless IP (Internet protocol) as a transport technology in the IuB interface instead of connection-oriented ATM. The use of connectionless IP as a transport technology allows opportunities not considered in original UTRAN networks, for example the capability of call control path establishment initiated by a base station which enables dynamic load balancing for distributed call processing when multiple call processors are used in a radio network controller (RNC) that serves one or more base stations. When a base station is joining a network, IP addressing information is exchanged between the base station and the RNC having the distributed call processing architecture.

In accordance with embodiments of the invention, systems and methods are provided for enabling load balancing in distributed call processing systems that may find applications in a 3GPP based network. The concepts described herein are not, however, limited in this regard and may be applicable to other system types, such as Long Term Evolution (LTE).

In a network employing distributed RNC call processing the IP addressing information cannot be efficiently pre-provisioned on UTRAN network elements (NEs) according to current standards. In some UTRAN networks, IuB call processing uses SCTP (stream control transmission protocol) associations (3GPP TS 25.432) in which SCTP association IP addresses and SCTP port numbers used by the base station and an RNC call processing engine remain unchanged for the duration of base station attachment to the RNC. An SCTP association is a protocol relationship between network elements, which is uniquely identifiable by transport address information used by the network elements of the association. The transport address information may be for example IP address information or IP address information and port number information for the respective Node B and RNC. The current standards do not provide a mechanism for dynamic allocation of call processing SCTP IP address and port number information.

Furthermore, according to current 3GPP standards and SCTP IETF RFC 2960 (IETF RFC 2960, (October 2000) it is not possible to dynamically change IP addresses during attachment of the base station when an SCTP association has been created.

Base stations will be referred to as Node B's in the following descriptions of methods, devices and systems.

Figure 2:
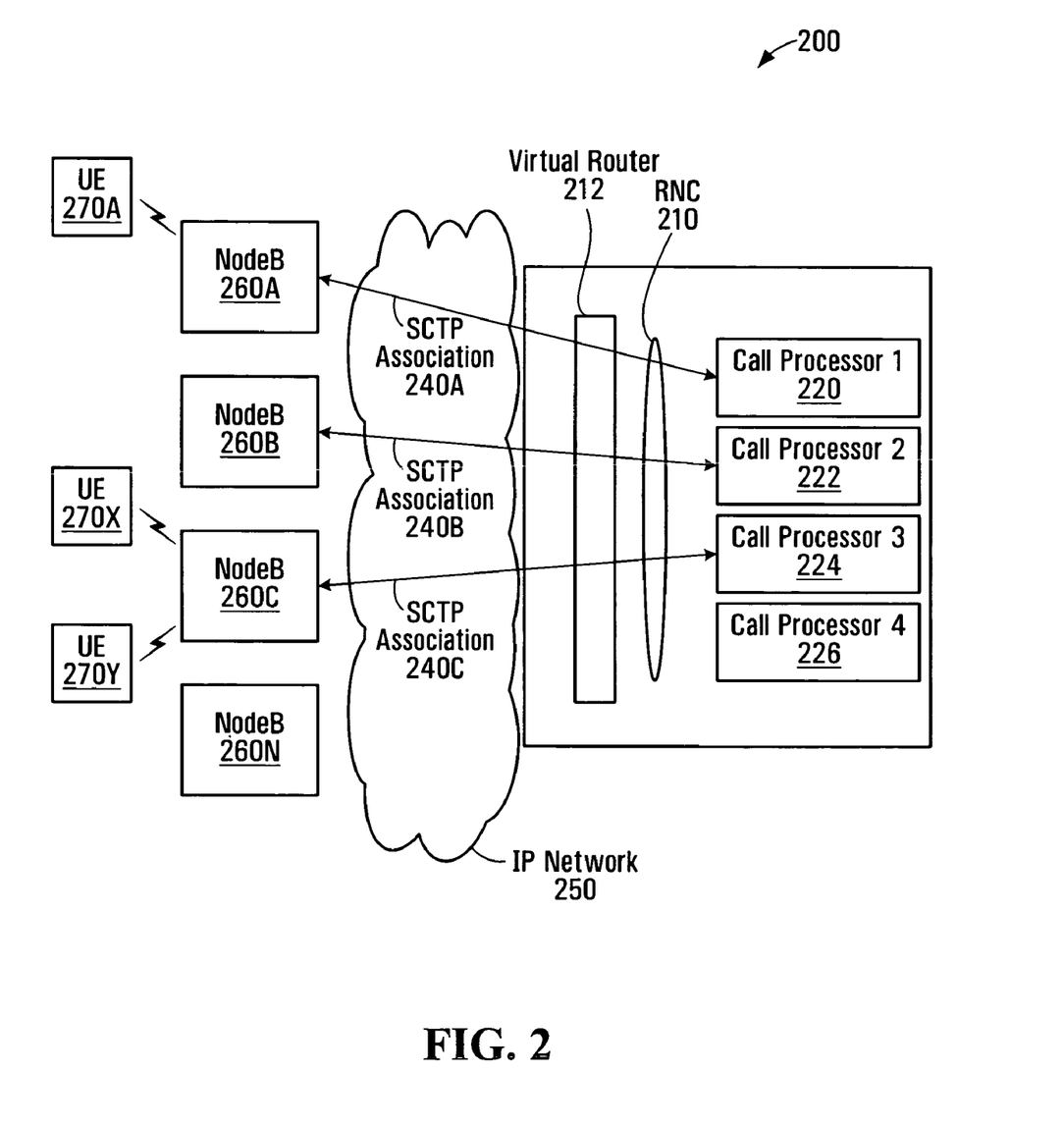
FIG. 2 is a block diagram of a UTRAN (UMTS Terrestrial Radio Access Network) network according to an embodiment of the invention.

With reference to FIG. 2, a particular example of a UTRAN network 200 on which embodiments of the invention may be implemented will now be described. The general structure of UTRAN network 200 is similar to that of the UTRAN network of UMTS radio access network 100 of FIG. 1, but there are differences that will be described below. RNC 210 includes a virtual router 212 and multiple call processors, four being shown 220, 222, 224, 226, that provide distributed call processing functionality. An example of a virtual router is a software controlled group of physical routers acting individually or collectively to provide routing services. The virtual router 212 routes IP packets between Node Bs and one or more of the multiple call processors.

In normal operation, RNC 210 is connected to a core network and may be connected to other components such as other RNCs and an OMC, similar to RNC 110 that is shown in FIG. 1. These are not shown in FIG. 2 or described in further detail as the connections and components are similar to FIG. 1.

In the illustrated example, call processors 220, 222, 224 are coupled to respective Node Bs 260A, 260B, 260C over IP network 250 with respective established SCTP associations. For example, SCTP association 240A represents the connection between call processor 1 220 and Node B 260A, SCTP association 240B represents the connection between call processor 2 222 and Node B 260B and SCTP association 240C represents the connection between call processor 3 220 and Node B 260C. In FIG. 2 it is assumed that Node B 260N has recently been positioned within range of the RNC 210 and is about to begin an initialization process of coupling to RNC 210.

In the illustrated example, Node B's 260A,260C are also in wireless communication with one or more user equipment (UE). A single UE 270A is in wireless communication with Node B 260A and two UE's 270X,270Y are in wireless communication with Node B 260C. Examples of UE's include, but are not limited to cell phones, wireless enabled PDAs (personal data assistants), and wireless modems in computers. The UE's may be fixed or mobile. No UE's are attached to Node B 260N as it has not yet initialized with the RNC 210.

The number of Node B's, the number of RNCs, the number of call processors in the RNC, are all implementation specific in the UTRAN network.

In the illustrated example, the Node B's are connected directly to the public IP network 250 without any secure connection. In other implementations, Node B's are located within enterprise domains behind firewalls that are connected to the public IP network. In some implementations, UMTS control signalling and user traffic on the SCTP association 240A, 240B, 240C are transported over the IP network 250 using Ethernet physical interconnect. However, other physical connection types are contemplated.

A logical IuB interface is a link between a respective Node B and the RNC. In the illustrated example, the logical IuB interface between Node B 260A and RNC 210 has an SCTP association 240A used for control plane traffic only, the logical IuB interface between Node B 260B and RNC 210 has an SCTP association 240B used for control plane traffic only and the logical IuB interface between Node B 260C and RNC 210 has an SCTP association 240C used for control plane traffic only.

CP traffic includes NBAP (Node B Application Part) signalling. NBAP is a signalling protocol used by the RNC in controlling the Node B.

When a Node B is added to a UTRAN network an initialization procedure involves setting up call control paths and user and signalling paths between the Node B and RNC as well as operation and application management between the Node B and the OMC. A broad aspect of the invention provides an attachment scheme that is used prior to setting up call control paths. In some embodiments, this allows load balancing of RNC resources. In some embodiments, the call control paths are SCTP call control associations used for NBAP signalling. In some embodiments, the attachment scheme uses attach request/response messaging between the Node B and RNC.

Figure 3:
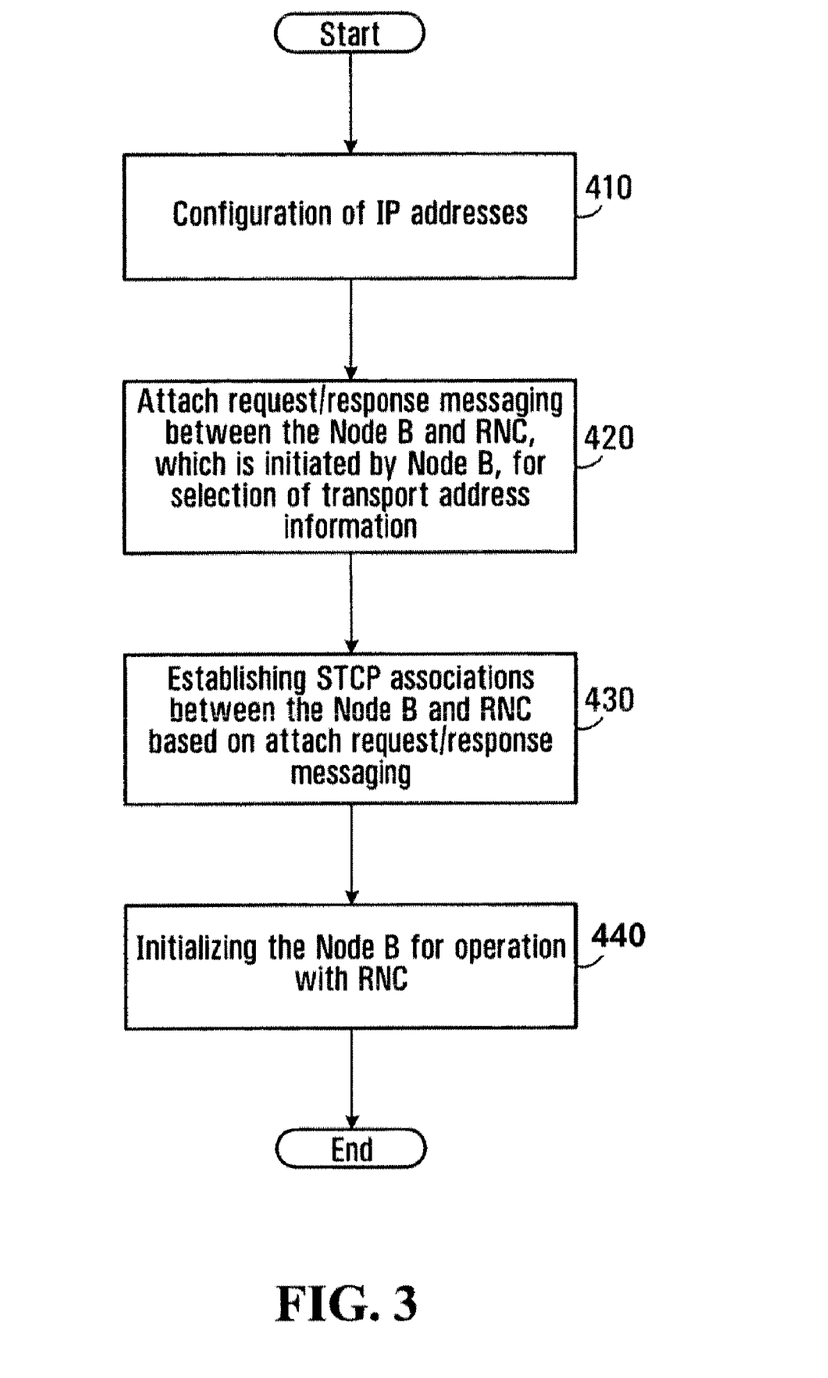
FIG. 3 is a flow chart for a RNC (Radio Network Controller)/Node B initialization according to an embodiment of the invention.

Referring to FIG. 3, a method will now be described for a Node B to initially access a network having an RNC, the method implementing an attachment scheme for establishing call control paths as provided by embodiments of the invention as part of the initialization. In the interest of brevity, this flowchart includes steps executed by the Node B and steps executed by the RNC. Note that further embodiments of the invention provide a method consisting only of Node B executed steps, and a Node B operable to execute such a method, and a method consisting only of the RNC executed steps, and a RNC operable to execute such a method.

FIG. 3 is an example of a general method involved with establishing connectionless control paths between an RNC and a given Node B. A first step 410 involves configuration of IP addresses used by the RNC and Node B. A second step 420 involves attach request/response messaging between the Node B and the RNC, which is initiated by the Node B, for selection of transport address information in the RNC. The transport address information may be for example IP address information or IP address information and port number information for RNC. A third step 430 involves the Node B establishing SCTP associations between the Node B and the RNC based on the attach request/response messaging. In some embodiments, the SCTP associations are used for NBAP signalling. A fourth step 440 involves initializing the Node B for operation with the RNC including for example setting up transport and signalling paths.

FIG. 3 describes the steps that occur in establishing a logical path flow between an RNC and a single Node B, however it is to be understood that the same process occurs for each new Node B that connects to an RNC or that the same process occurs when multiple Node B's need to reconnect to an RNC for example following a network disruption.

In some embodiments, steps 410 and 440 are consistent with processes performed according to existing 3GPP standards for RNC/Node B communications when the transport technology is ATM. In some implementations, establishing common channel paths in step 440 is performed using Node B Application Part (NBAP) signalling between the RNC and base station. The main difference in both steps relates to the IuB interface transport technology being IP instead of ATM.

An additional step to the method may include call establishment between UE's served by the Node B's and the RNC as warranted for UE's that desire to access the UMTS radio access network via the given Node B. Establishing calls between the RNC and UE's is consistent with processes performed according to existing 3GPP standards, for example the "Callp" sequence for RNC/Node B communications when the transport technology is ATM.

Before describing methods for implementing the attachment scheme provided by embodiments of the invention in further detail, a brief description of an example IP addressing framework and Node B/RNC logical control paths will be described.

IP Addressing Framework

Figure 4A:
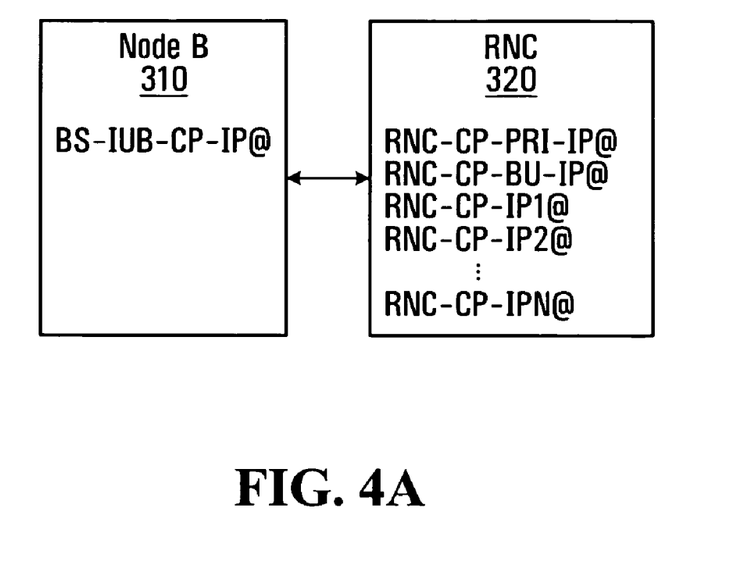
FIG. 4A is a block diagram of an example of IP addressing used for control plane signalling.

Referring to FIG. 4A, an example of IP addressing for a Node B 310 and an RNC 320 will now be described. Initially, global IP addresses are provided to RNC 320 and Node B 310. In some embodiments, the IP addressing structure enables SCTP associations.

The given Node B is assigned a unique identifier called the "Node B ID" by the network that will be used by the RNC to uniquely identify the Node B. The unique identifier may be used by the RNC to provide any RNC configuration data to the Node B.

IP addresses for a Node B are pre-provisioned in any conventional manner used for assigning IP addresses to the Node B. Node B 310 has a control plane (CP) IP address, for example BS-IUB-CP-IP@ for control plane signalling. The Node B also has other IP addresses (not shown) assigned to it for user plane (UP) and common channel signalling.

In some modes of operation, the Node B IP address may be configured directly in the Node B to avoid dependency on components of the network responsible for assigning IP addresses during the initial Node B attachment phase.

IP addresses for the RNC are pre-provisioned in any conventional manner used for assigning IP addresses to the Node B. The RNC 320 supports multiple CP IP addresses (RNC-CP-PRI-IP@, RNC-CP-BU-IP@, RNC-CP-IP1@, RNC-CP-IP2@, RNC-CP-IPN@) for CP signalling. The RNC also has other IP addresses assigned to it (not shown) for UP and common channel signalling. For example, some IP addresses are used as addresses for receipt of attach request messages sent by a Node B and other IP addresses are used as addresses for the multiple call processors or other resources within the RNC. In some embodiments, the RNC supports an IP address for each of the multiple call processors in the RNC. More generally, the number of CP IP addresses supported by the RNC is implementation specific. In some embodiments, the RNC CP IP addresses used for attach request messaging are static after they have been assigned to the RNC.

In some embodiments, the Node B attaching to the network is notified of two of the pre-provisioned RNC CP IP addresses as destination addresses to send an attach request message, one to use as a primary address (RNC-CP-PRI-IP@) when contacting the RNC and one to use as a backup address (RNC-CP-BU-IP@). The given Node B may attempt to establish connectivity with the RNC using either the primary or backup IP addresses when sending the attach request message. Utilizing two IP addresses allows the Node B an alternative addresses when establishing contact with the RNC. For example, if an attachment attempt with the primary address is not successful, the Node B can attempt contact with the backup address on a subsequent attachment attempt.

In a specific example, a configuration server that is located in the network is provided with RNC CP IP address information. The configuration server is then operable to notify the Node B of an IP destination address that is one or more of the RNC IP addresses. The Node B uses the IP destination address when sending attach request messages to the RNC.

In some embodiments, the attach request message is sent by the Node B at random time intervals using a backoff algorithm. For example, when using a backoff algorithm, if a first attempt at communication by a first station with a second station is unsuccessful, the first station waits a duration of time and attempts communication again at a later time. In some forms of backoff, the first station waits a longer duration after each attempt until the attempt is successful.

When the RNC responds with an attach response message, a new RNC CP address is provided by the RNC to be used by the Node B for all NBAP signalling. In some embodiments, the new address is an IP address associated with one of the multiple call processors. The new address for example is one of RNC-CP-IP1@, RNC-CP-IP2@, RNC-CP-IPN@. The RNC dynamically allocates call processing resources to a Node B during the initialization process by selecting an appropriate RNC CP IP address. The attach request/response messaging scheme allows the Node B and RNC to dynamically configure the call control paths without the network having to pre-configure all Node B's before deployment.

The new RNC CP IP address are used for the lifetime of control plane SCTP connectivity between the Node B and RNC until another attach request/response messaging sequence occurs, for example when the Node B is re-initialized.

The attach request/response messaging enables the creation of call control paths between the Node B and RNC. The call control paths facilitate creation of common channel paths and dedicated user data paths between the Node B and RNC.

For scalability, the number of RNC CP address should allow scaling both on the RNC and Node B for additional CP addresses. More generally, the number of CP addresses that should be allowed for scalability is implementation specific.

In some embodiments, in addition to the RNC selecting an RNC CP IP address to be used in establishing the call control path between the RNC and Node B, the RNC may also allocate SCTP ports of the RNC to be used in conjunction with the IP addresses for further defining the call control paths.

RNC/Node B Logical Control Paths

Figure 4B:
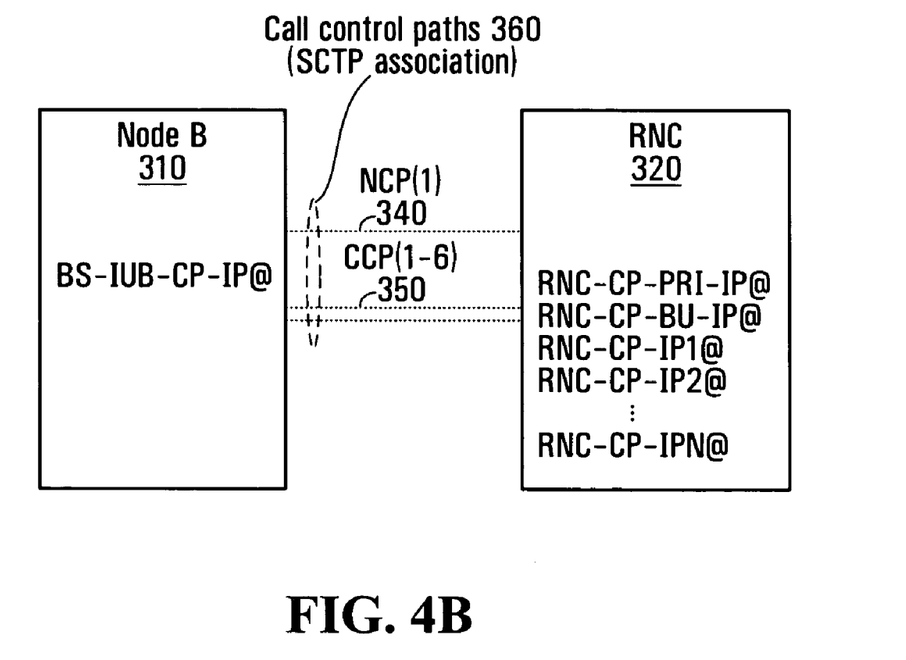
FIG. 4B is a block diagram of an example of control plane logical flows according to an embodiment of the invention.

An example of UTRAN logical control paths (CP) will now be described with reference to FIG. 4B. FIG. 4B has the same structure as FIG. 4A. The Node B 310 and RNC 320 include the same CP IP addresses as described above. In some embodiments, the call control path is consistent with 3GPP transport path standards.

In some embodiments, the CP logical call control paths 360 are identified using a combination of IP addresses (IP@) and SCTP port numbers.

In some implementations, for signalling on the control plane, each of Node B 310 and RNC 320 includes a NCP (Node B Control Port) for common NBAP signalling between the Node B and RNC. This logical path flow is indicated at 340.

Also for some implementations, for signalling on the control plane, each of Node B 310 and RNC 320 also includes a CCP (Communication Control Port) for dedicated NBAP signalling. In some embodiments, the CCP is initially a single port, but additional ports may be supported, for example up to six ports. These logical path flows are indicated at 350.

More generally, Node B 310 and RNC 320 have any number of CPP ports allocated for control plane signalling over call control paths 360.

In some embodiments, SCTP ports corresponding to SCTP associations have a one SCTP port to one NCP or CCP mapping in the Node B and RNC. In such situations, a single SCTP association carries NBAP traffic between a single NCP (or CCP) of the Node B and a single NCP (or CPP) of the RNC. In some embodiments, SCTP ports corresponding to SCTP associations have a one SCTP port to multiple NCP and/or CCP mapping in the Node B and RNC. In such situations, a single SCTP association carries NBAP traffic between multiple NCP and/or CCP of the Node B and multiple NCP and/or CPP of the RNC.

For initial communication between RNC 320 and Node B 310, a well-defined port number is specified to enable addressing information of the Node B and RNC to be determined prior to establishing SCTP associations. This port number is associated with the initial attach request message sent from Node B to RNC on startup.

Referring again to FIG. 3, Step 420 will now be described in further detail. At particular intervals, the Node B sends attach request messages to establish communication with the RNC. In some embodiments, the attach request message is sent at random time intervals with an increasing backoff interval to avoid scenarios in which large numbers of Node B's send requests to the RNC. In some embodiments, the backoff process that is used is similar to a backoff process used in Ethernet CSMA/CD.

An address in the attach request message includes a destination address, for example RNC-CP-PRI-IP@+Attach-Port# and an alternate or backup address of RNC-CP-BU-IP@+Attach-Port#. The attach request message may also include a source address, for example, in the form BS-IUB-CP-IP@+Attach-Port#.

The attach request message sent by the Node B may include some or all of the following information: Node B name; Node B NCP-Port#; Node CCP-Port#.

When the RNC receives the attach request message it uses the data in the message to allocate internal resources to handle Node B cell and eventual UE traffic, and determines the appropriate transport address configuration data required for the Node B. Therefore, the RNC uses data in the attach request message as well as the RNC's own familiarity with previously allocated resources to provide the Node B with transport address configuration data to balance the load of RNC resources.

The RNC then replies to the Node B with an attach response message. The attach response message includes port numbers for example RNC NCP and RNC CCP ports, and an RNC CP address to be used for creating the call control path between the Node B and RNC, for example RNC-CP-IP1@.

Once the Node B receives the attach response message, it uses the base station communication port number, the common communication port number, a base station control plane IP address, an RNC control plane IP address, an RNC communication port number dedicated to the base station and an RNC common communication port number to form SCTP associations. The outcome of the attach request/response message exchange is the establishment of SCTP NBAP call control paths between RNC and Node B.

In some embodiments, the RNC may provide the Node B with retry interval information. The retry interval information received by the Node B may be used by the Node B in determining and/or setting an appropriate retry interval for sending the attach request message. In some embodiments, if the attach request message is received by the RNC, but unsuccessful, the RNC may send the retry interval information in an attach response message. In some embodiments, the retry interval information may be maintained by the Node B and used at a later time, for example if the Node B were to reset, requiring a new attach request to be sent and that attach request was unsuccessful in a first attach attempt.

Figure 5:
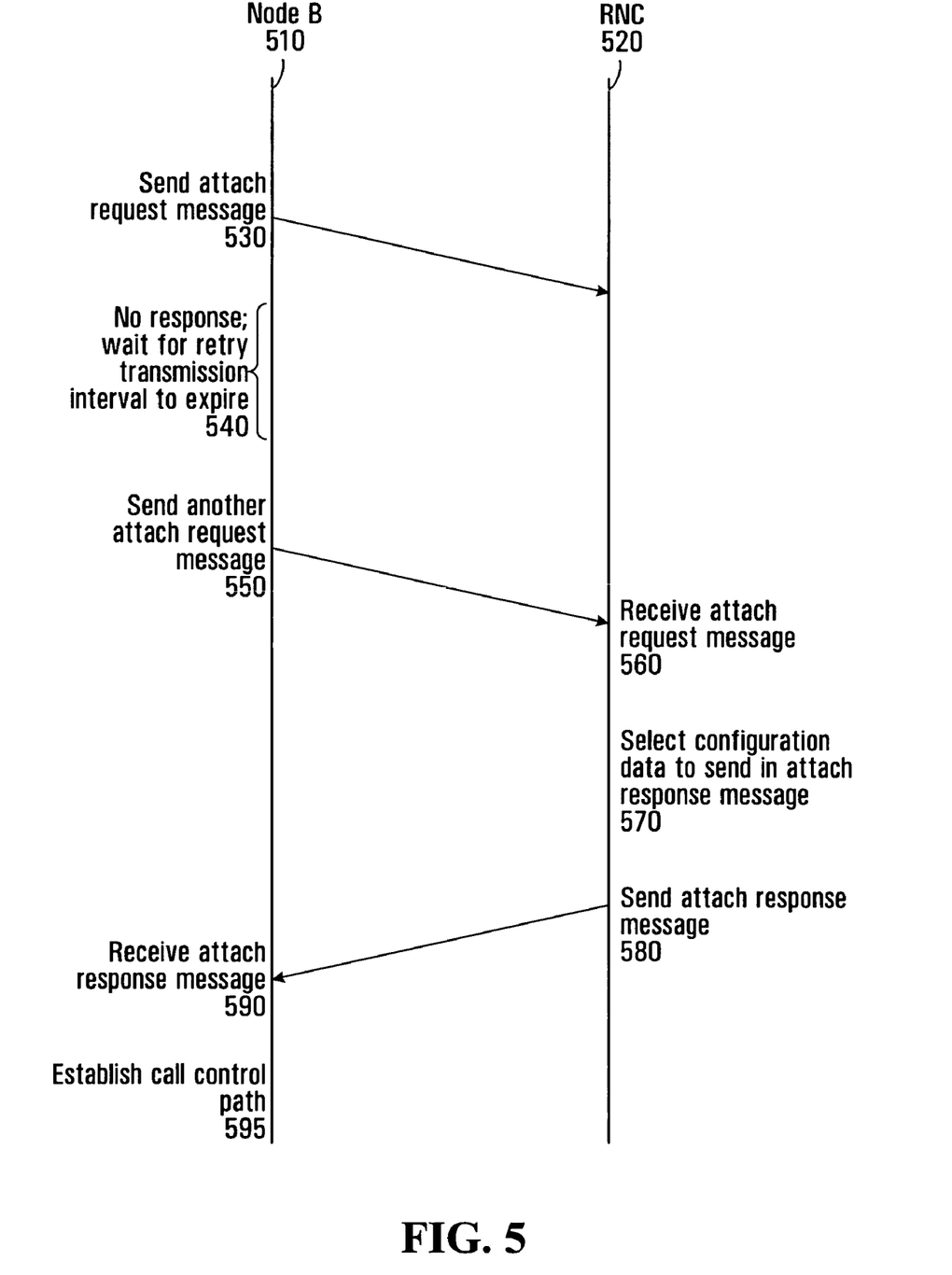
FIG. 5 is a signalling diagram for an example request/response messaging between an RNC and a Node B.

Referring to FIG. 5, an example of attach request/response messaging between a Node B 510 and an RNC 520 when a first attach request message is not successful in contacting RNC 520 will now be described. At 530, Node B 510 sends an attach request message to RNC 520. At 540, Node B 510 does not receive a response to its request, so Node B 510 waits for a retry transmission interval to expire. At 550, once the retry transmission interval has expired, Node B 510 resends an attach request message to RNC 520. Node B 510 may resend the attach request message to the same IP address as the first transmission that was sent at 530, or the attach request message may be sent to a backup IP address. At 560, RNC 520 receives the attach request message. At 570, RNC 520 selects configuration data to be sent to the Node B in an attach response message. The configuration data may include IP address information and port numbers used in making SCTP associations. In some embodiments, this may include selecting configuration data based on dynamic load balancing for distributed call processing resources in the RNC 520. At 580, RNC 520 sends the attach response message to the Node B 510. At 590, Node B 510 receives the attach response message. At 595, Node B 510 uses the configuration data in the attach response message to establish call control paths between the Node B 510 and RNC 520 using port number and IP address information. For example, an SCTP association is created using the port number and IP address of Node B 510 and the port numbers and IP addresses in the configuration information sent by the RNC 520.

FIG. 5 illustrates a scenario in which a first attempt by a Node B to attach to a RNC is unsuccessful and a second attempt is successful. It is to be understood that this is one example of how the attach response/request messaging may occur. In other scenarios, the attachment method may be successful in a first attempt, or it may take more than two attempts to attach successfully.

In some embodiments, the invention facilitates installation of base stations (BS), when using a distributed, dynamically load balanced UTRAN RNC call processing architecture. Methods provided by embodiments of the invention may aid in simplifying installation of BS's without requiring prior knowledge of the call processing architecture in the network.

In some embodiments, methods for Node B attachment have been added to the Node B and RNC installation phase that are consistent with 3GPP standards as part of a "plug and play" deployment method.

The methods for Node B attachment to the network enable the Node B to be installed and dynamically registered with the RNC. The Node B obtains access to call processing resources from the RNC over public and IP networks to offer services to UEs that the newly attached Node B serves.

In some embodiments, following methods for Node B attachment described herein, the information obtained by the Node B is used in operation of NBAP control plane as defined by in 3GPP.

In some embodiments, the methods described herein for initial attachment of the Node B into the network precedes a startup sequence defined in 3GPP standards used for attachment of a Node B into the network utilizing a non-distributed call processing architecture.

In some implementations, during the Node B attachment phase, dynamically allocated IP addresses, port numbers and other information are exchanged between the RNC and Node B.

In some implementations, the Node B attachment procedure is repeated each time the Node B restarts connection to an RNC either due to network outage or due to relocation to another point of attachment. The Node B attachment procedure may also be repeated following software upgrades to the RNC and/or Node B and configuration data changes to the RNC and/or Node B.

Figure 6:
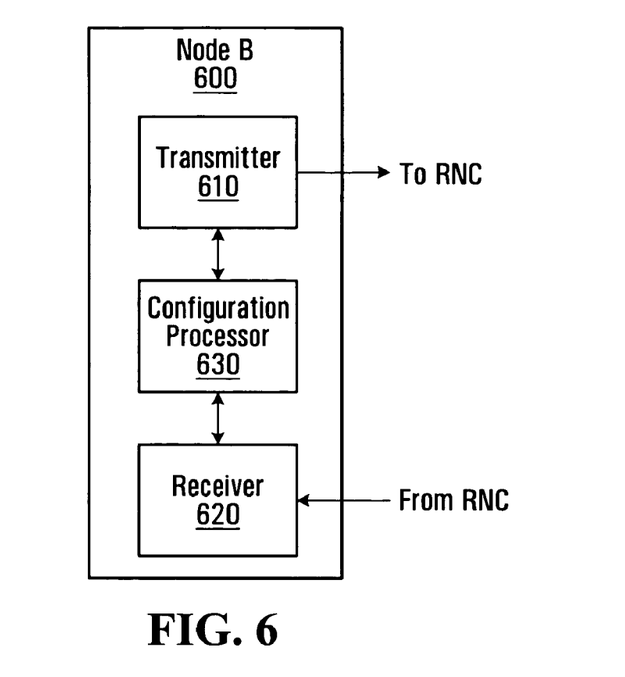
FIG. 6 is a block diagram of a Node B according to an embodiment of the invention.

With reference to FIG. 6, an example of a Node B 600 operable to implement embodiments of the invention will now be described. The Node B 600 includes a transmitter 610 for transmitting an attach request message including an identification of the base station, a base station communication port number, a common communication port number, and a transmission retry interval. The transmitter 610 is also used for establishing common channel paths with the RNC and setting up dedicated user data paths between the Node B 600 and the RNC.

The Node B 600 includes a receiver 620 for receiving an attach response message including a radio network controller (RNC) control plane IP address and an RNC base station communication port number and an RNC common communication port number. The receiver 620 is also used for establishing common channel paths with the RNC and setting up dedicated user data paths between the Node B 600 and the RNC.

The Node B 600 includes a configuration processor 630 for generating a logical interface between the base station and the RNC based on information received in the attach response message. The configuration processor 630 may be a separate and distinct processor from other processor in the Node B for other purposes, or its functionality may be implemented by a same processor performing other tasks in the Node B.

The Node B includes other functional components for basic operating functionality such as communicating with configuration servers, UE's and other network elements that are not described in any further detail or shown in FIG. 6.

Figure 7:
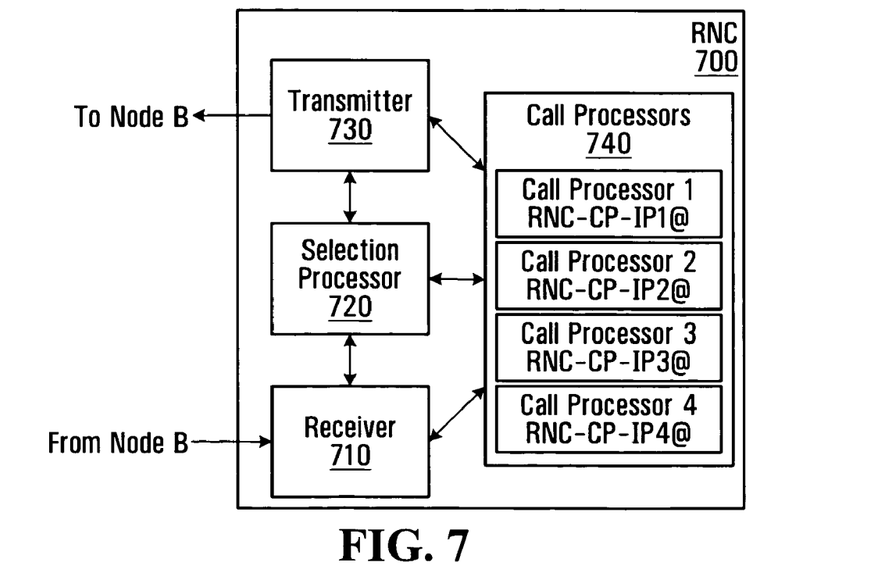
FIG. 7 is a block diagram of a RNC according to an embodiment of the invention.

With reference to FIG. 7, an example of a radio network controller (RNC) 700 operable to implement embodiments of the invention will now be described. The RNC includes a receiver 710 for receiving an attach request message from a Node B, the message including an identification of the Node B, a Node B communication port number, a common communication port number, and a transmission retry interval.

The RNC 700 includes a transmitter 730 for transmitting an attach response message including the RNC control plane IP address and the connection port numbers.

In the illustrate example of FIG. 7, the RNC 700 further includes multiple call processors 740, four of which are shown Call Processor 1, Call Processor 2, Call Processor 3 and Call Processor 4, operable in a distributed manner. Each call processor has an assigned IP address for control plane signalling, for example RNC-CP-IP1@, RNC-CP-IP2@, RNC-CP-IP3@, RNC-CP-IP4@.

The RNC 700 includes a selection processor 720 for selecting connection path port numbers and an RNC control plane IP address to enable a logical interface between the RNC and the base station. In some embodiments, the selection processor 720 selects connection path port numbers and an RNC control plane IP address in such a manner to balance the load for the call processors.

The transmitter 730, receiver 710, and selection processor 720 are each coupled to some or all of the multiple call processors. In this manner the selection processor 720 is aware of current call processor usage, which aids in the selection of connection path port numbers and an RNC control plane IP address to balance the load on the call processors. The transmitter 730 and receiver 710 are coupled to the call processors 740 to allow communication between the Node B and the call processors.

The RNC includes other functional components for basic operating functionality such as communicating with the core network, other RNC's OMC and other network elements that are not described in any further detail or shown in FIG. 7.

While the above description has referred in particular to SCTP (as specified in 3GPP standards), more generally other types of transport protocols are also contemplated for establishing call control paths. Another transport protocol that may be considered is for example UDP (user datagram protocol).

Numerous modifications and variations of the present invention are possible in light of the above teachings. It is therefore to be understood that within the scope of the appended claims, the invention may be practised otherwise than as specifically described herein.

The invention claimed is:

1. A method for establishing a logical flow path between a radio network controller (RNC) having multiple call processors that are operable in a distributed manner and a base station being served by the RNC using a connectionless internet protocol (IP) transport technology, the method comprising establishing connectionless call control paths, during base station installation, between the RNC and base station using request and response messaging initiated by the base station using the connectionless IP transport technology in an IuB interface, prior to generating an SCTP (stream control transmission protocol) association;

wherein establishing call control paths between the RNC and base station further comprises:
the base station sending an attach request message comprising an identification of the base station, a base station Node B control port (NCP) number, a base station communication control port (CCP) number, and a transmission retry interval; and
the base station receiving an attach response message comprising an RNC control plane IP address, an RNC NCP number and an RNC CCP number; and
the base station forming SCTP (stream control transmission protocol) associations using the base station NCP-number, the base station CPP number, a base station control plane IP address, the RNC control plane IP address, the RNC NCP number and the RNC CCP number; and
balancing a load on RNC processing resources, which further comprises the RNC selecting RNC ports and an RNC IP address dedicated to the base station for establishing at least one call control path, the selecting based-on awareness of previously allocated processing resources.

2. The method of claim 1, wherein establishing call control paths between the RNC and base station comprises:
attach request and response messaging occurring between the base station and the RNC, which is initiated by the base station during installation thereof, for selection of transport address information in the RNC; and
the base station establishing SCTP associations between the base station and the RNC based at least in part on the attach request and response messaging.

3. The method of claim 1 further comprising:
configuring of IP addresses to be used by the RNC and base station;
initializing the base station for operation with the RNC.

4. The method of claim 3 wherein configuring of IP addresses to be used by the RNC and base station comprises:
notifying the base station of a first RNC control plane IP address as a primary destination IP address and a second RNC control plane IP address as a backup destination IP address for sending connectionless attach request messages.

5. The method of claim 3 wherein configuring of IP addresses to be used by the RNC comprises assigning static IP addresses to the RNC.

6. The method of claim 1 wherein establishing call control paths between the RNC and base station further comprises:

the RNC receiving a attach request message comprising an identification of the base station, a base station Node B control port (NCP) number and a base station communication control port (CCP) number;

the RNC selecting an RNC control plane IP address, an RNC NCP number and an RNC CCP number;

the RNC sending a attach response message comprising the selected RNC control plane IP address, the selected RNC NCP number and the selected RNC CCP number.

7. The method of claim 6 wherein selecting an RNC control plane IP address, an RNC NCP number and an RNC CCP number comprises:

selecting the RNC control plane IP address, the RNC NCP number dedicated to the base station and the RNC CCP number in a manner to balance a load on RNC processing resources.

8. The method of claim 1 further comprising establishing calls between user equipment (UE) and the RNC via the base station subsequent to initializing the base station for operation with the RNC.

9. The method of claim 1 wherein selecting an RNC control plane IP address comprises dynamically assigning an IP address to the base station.

10. The method of claim 1 further comprising:

repeating the method each time the base station restarts connection to an RNC due to any one of:

a network outage and a relocation to another point of attachment.

11. A system for performing the method of claim 1 comprising:

one or more radio network controller (RNC) coupled to a core network, at least one RNC of the one or more RNC having multiple call processors that are operable in a distributed manner;

each of the at least one RNC coupled to:

at least one base station via an IP network wherein during establishment of a logical link between a respective RNC-and-base station pair, the respective RNC-and-base station pair use request and response messaging initiated by the base station to define call control paths between the RNC-and-base station pair.

12. The system of claim 11 wherein during establishment of a logical link between a respective RNC-and-base station pair the RNC selects RNC ports and an RNC IP address dedicated to the base station for establishing a call control path for the logical link between the respective RNC and base station in a manner that enables balancing a load on the multiple call processors.

13. A base station comprising:

a transmitter for transmitting, during base station installation, an attach request message comprising an identification of the base station, a base station Node B control port (NCP) number, a base station communication control port (CCP) number, and a transmission retry interval;

a receiver for receiving an attach response message comprising a radio network controller (RNC) control plane IP address and an RNC Node B control port (NCP) number and an RNC communication control port (CCP) number;

a configuration processor for generating a logical interface between the base station and the RNC based at least in part on information received in the attach response message;

wherein the base station employs a connectionless internet protocol (IP) transport technology when transmitting and receiving to establish connectionless call control paths;

wherein establishing call control paths between the RNC and base station further comprises:

the base station forming SCTP (stream control transmission protocol) associations using the base station NCP-number, the base station CPP number, a base station control plane IP address, the RNC control plane IP address, the RNC NCP number and the RNC CCP number; and balancing a load on RNC processing resources, which further comprises the RNC selecting RNC ports and an RNC IP address dedicated to the base station for establishing at least one call control path, the selecting based-on awareness of previously allocated processing resources.

14. The base station of claim 13 wherein the logical interface is an SCTP (stream control transmission protocol) association defined by IP addresses and port numbers of the base station and the RNC.

15. A radio network controller (RNC) comprising:

a receiver for receiving, during base station installation, an attach request message comprising an identification of a base station, a base station Node B control port (NCP) number, a base station communication control port (CCP) number, and a transmission retry interval;

a processor for selecting connection path port numbers and an RNC control plane IP address to enable a logical interface between the RNC and the base station;

a transmitter for transmitting an attach response message comprising the RNC control plane IP address and the connection port numbers;

wherein the RNC employs a connectionless internet protocol (IP) transport technology when receiving and transmitting to establish connectionless call control paths;

wherein establishing call control paths between the RNC and base station further comprises:

the base station forming SCTP (stream control transmission protocol) associations using the base station NCP-number, the base station CPP number, a base station control plane IP address, the RNC control plane IP address, the RNC NCP number and the RNC CCP number; and balancing a load on RNC processing resources, which further comprises the RNC selecting RNC ports and an RNC IP address dedicated to the base station for establishing at least one call control path, the selecting based-on awareness of previously allocated processing resources.

16. The RNC of claim 15 further comprising a plurality of call processors operable in a distributed manner, wherein the selection processor performs the selecting based on balancing the load for the plurality of call processors.

* * * * *